United States Patent
An et al.

(10) Patent No.: US 8,543,473 B2
(45) Date of Patent: Sep. 24, 2013

(54) BUSINESS PARTNER COLLABORATION AND BUY ANALYSIS

(75) Inventors: Lianjun An, Yorktown Heights, NY (US); Blair A. Binney, Marlboro, NY (US); Markus Ettl, Yorktown Heights, NY (US); Mamnoon Jamil, Voorhees, NJ (US); Shubir Kapoor, Shrub Oak, NY (US); Rajesh K. Ravi, Croton On Hudson, NY (US); Yadav P. Singh, Tarrytown, NY (US); Karthik Sourirajan, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 855 days.

(21) Appl. No.: 12/269,105

(22) Filed: Nov. 12, 2008

(65) Prior Publication Data
US 2010/0121677 A1 May 13, 2010

(51) Int. Cl.
G06Q 10/00 (2012.01)
G06Q 20/00 (2012.01)
G06G 1/14 (2006.01)
G07B 17/00 (2006.01)
G07F 19/00 (2006.01)

(52) U.S. Cl.
USPC ............ 705/28; 705/7.11; 705/7.12; 705/20; 705/22; 705/30

(58) Field of Classification Search
USPC ..................................................... 705/22–28
See application file for complete search history.

(56) References Cited

U.S. PATENT DOCUMENTS

| | | | |
|---|---|---|---|
| 2001/0049690 A1* | 12/2001 | McConnell et al. | 707/104.1 |
| 2004/0143486 A1 | 7/2004 | Yeow et al. | |
| 2004/0225556 A1* | 11/2004 | Willen et al. | 705/10 |
| 2004/0243487 A1 | 12/2004 | Tien et al. | |
| 2005/0044001 A1* | 2/2005 | Narayanaswami | 705/26 |
| 2005/0108114 A1 | 5/2005 | Kaled | |
| 2005/0235274 A1* | 10/2005 | Mamou et al. | 717/136 |
| 2005/0256787 A1* | 11/2005 | Wadawadigi et al. | 705/28 |
| 2008/0114622 A1* | 5/2008 | Crean et al. | 705/5 |
| 2008/0288889 A1* | 11/2008 | Hunt et al. | 715/810 |

OTHER PUBLICATIONS

Fry, et al., "Coordinating Production and Delivery Under a (z,Z)-type Vendor-Managed Inventory Contract".
"Logistics Visibility Dashboard", Covisint Headquarters.

* cited by examiner

*Primary Examiner* — Ig T An
(74) *Attorney, Agent, or Firm* — Scully, Scott, Murphy & Presser PC; Daniel P. Morris, Esq.

(57) ABSTRACT

The present invention provides a method, system and computer program product for implementing an automated inventory replenishment process between a manufacturer and a business partner. In one embodiment of the invention, a method is provided comprising the business partner purchasing and maintaining an inventory of goods from the manufacturer, and the manufacturer providing price protection to the business partner for the purchasing of the goods. This embodiment further comprises managing said inventory by using an automated process that takes into account said price protection for the purchasing of the goods.

19 Claims, 8 Drawing Sheets

BUSINESS PARTNER COLLABORATION AND BUY ANALYSIS

BACKGROUND OF THE INVENTION

1. Field of the Invention

This invention generally relates to automated inventory replenishment, and more specifically, to inventory management practices that consider the effects of price protection on inventory stocking decisions.

2. Background Art

Many Original Equipment Manufacturers (OEMs) sell their products through business partners such as distributors, solution integrators, or resellers. Price protection has become a standard element of contracts between an OEM and its business partners to achieve the right balance between inventory and customer service levels in supply chains with short product life-cycles and rapidly changing prices. Purchase price protection is a common feature that is used to entice customers into buying products and/or services. There are several different types of purchase price protection offered by retailers. One common form of purchase price protection includes insuring the purchase price of the product and/or service for a period of time, such as 30 or 60 days. While price protection is intended to provide business partners with an incentive to stock sufficient inventory, it often leads to overstocking resulting in higher inventory-related costs for business partners and increased price protection expenses and sales incentive costs for the OEM.

The prior art includes methods for inventory management under Vendor-Managed Inventory (VMI) contracts. However, existing VMI practices do not consider the effects of price protection on inventory stocking decisions, e.g., Fry et al. "Coordinating Production and Delivery under a (z,Z) Type VMI contract", Manufacturing & Service Operations Management, 2005.

A vendor-managed inventory system may be based on a network environment which comprises a vendor system, a buyer system and an external network connecting the two systems. The buyer system includes a buyer server, multiple workstations and manufacturing devices, a plurality of storage locations, and a sensor device. These entities of the buyer system are connected or linked through an internal network. Each storage location stores a small quantity of production material to be consumed by one of the manufacturing devices. The sensor device monitors quantities of materials at the storage locations via the internal network. When a quantity of any material falls below a specified threshold, the sensor device triggers an alert signal. The alert signal is then transferred to the buyer server, and material requirements information is generated and transmitted to the vendor system. Afterward, the required material is delivered to the buyer's premises by the vendor. These systems, however, do not take into account the effects of price protection on inventory stocking decisions.

SUMMARY OF THE INVENTION

Embodiments of the invention provide a method, system and computer program product for implementing an automated inventory replenishment process between a manufacturer and a business partner. In one embodiment of the invention, a method is provided comprising the business partner purchasing and maintaining an inventory of goods from the manufacturer, and the manufacturer providing price protection to the business partner for the purchasing of the goods. This embodiment further comprises managing said inventory by using an automated process that takes into account said price protection for the purchasing of the goods.

One embodiment of the invention, described in detail below, provides a collaboration system that enables optimized buy recommendations, improving operational efficiency in the OEM-business partner relationship. This embodiment of the invention comprises a web-based visibility dashboard that provides real-time visibility to business partner sales out and inventories, and dynamic forecasting analytics. The embodiment further comprises innovative inventory analytics for optimized replenishment decisions, proactive buy and sell alerts for business partners based on up-to-date inventory and sales information, and demand shaping to mitigate demand and supply imbalances.

Embodiments of the invention provide a number of significant advantages. For example, embodiments of the invention provide a Single point of standardized reporting for an OEM and its business partners, customized inventory decisions for each part based on statistical forecasting and risk-optimized recommended buy, proactive buy/sell headlights to business partners for each part, and proactive automated alerts on stockouts, aging inventory and price protection risk for demand shaping or demand conditioning. Embodiments of the invention also provide robust product transition planning based on information about predecessor, successor and similar pattern, efficient channel collaboration processes with reduced manual efforts, and optimized manufacturing & channel inventory, and end-to-end supply chain synchronization.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
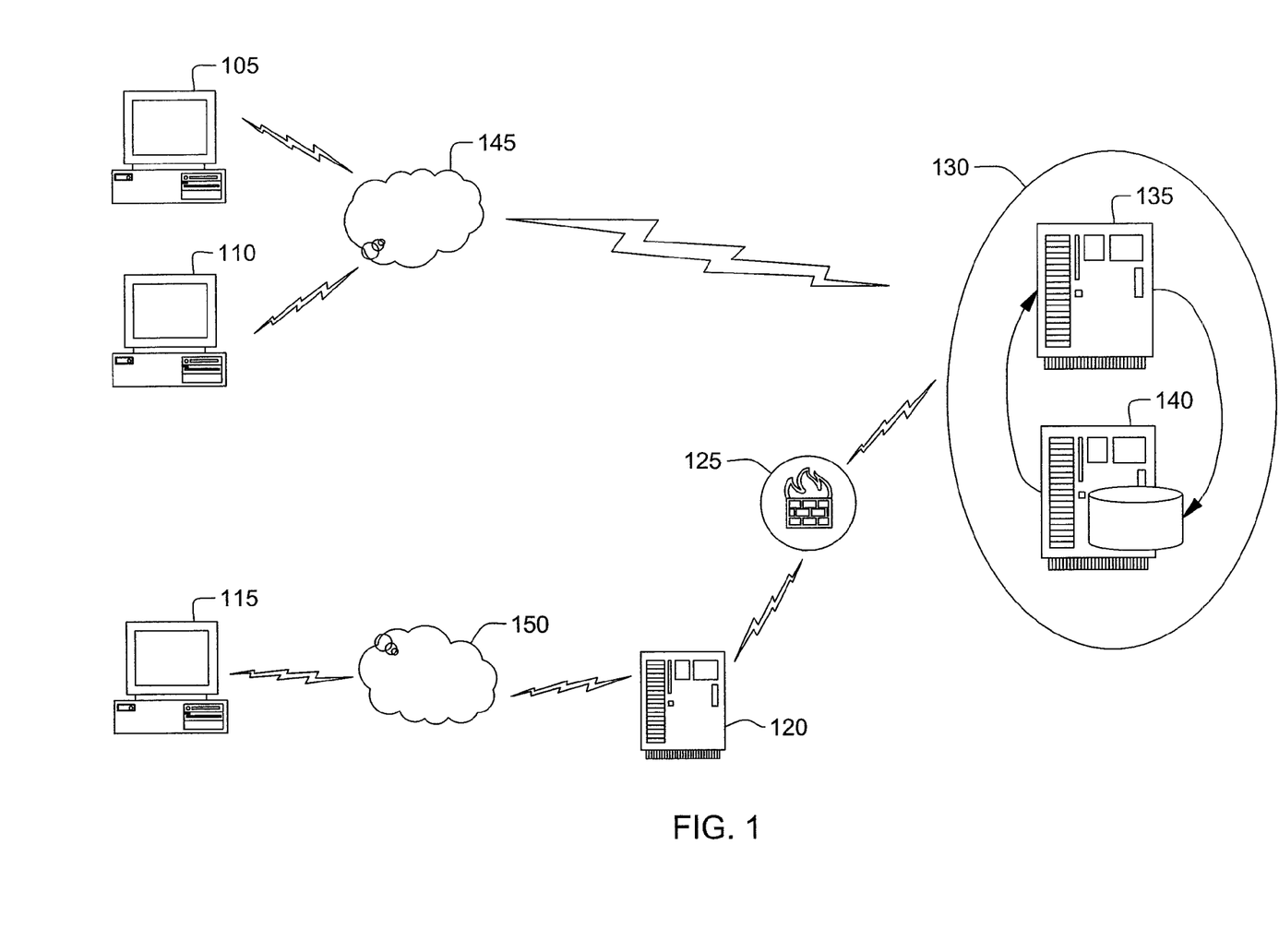
FIG. 1 is a diagram illustrating an architecture used to replenish inventory.

FIG. 1 is a diagram illustrating a web architecture used to replenish low inventory parts in accordance with one embodiment of the invention. FIG. 1 includes a first internal web client 105, a second internal web client 110, a business partner web client 115, a web server network 130 comprising a web server 135 and a second database server 140. The first internal web client 105 and the second internal web client 110 access the web server network 130 with a software application 145 for Internet web access whereas the business partner web client 115 uses the software application 145 for Internet web access, which connects to a secure server 150 that securely routes through a firewall 125 to connect to the web server network 130.

Embodiments of the invention provide a method, system and computer program solution for implementing an automated collaboration and replenishment process between an Original equipment Manufacturer (OEM) and its business partners. In one embodiment of the invention, a method is provided comprising the business partner purchasing and maintaining an inventory of goods from the manufacturer, and the manufacturer providing price protection to the business partner for the purchasing of the goods. This embodiment further comprises managing said inventory by using an automated process that takes into account said price protection for the purchasing of the goods.

Figure 2:
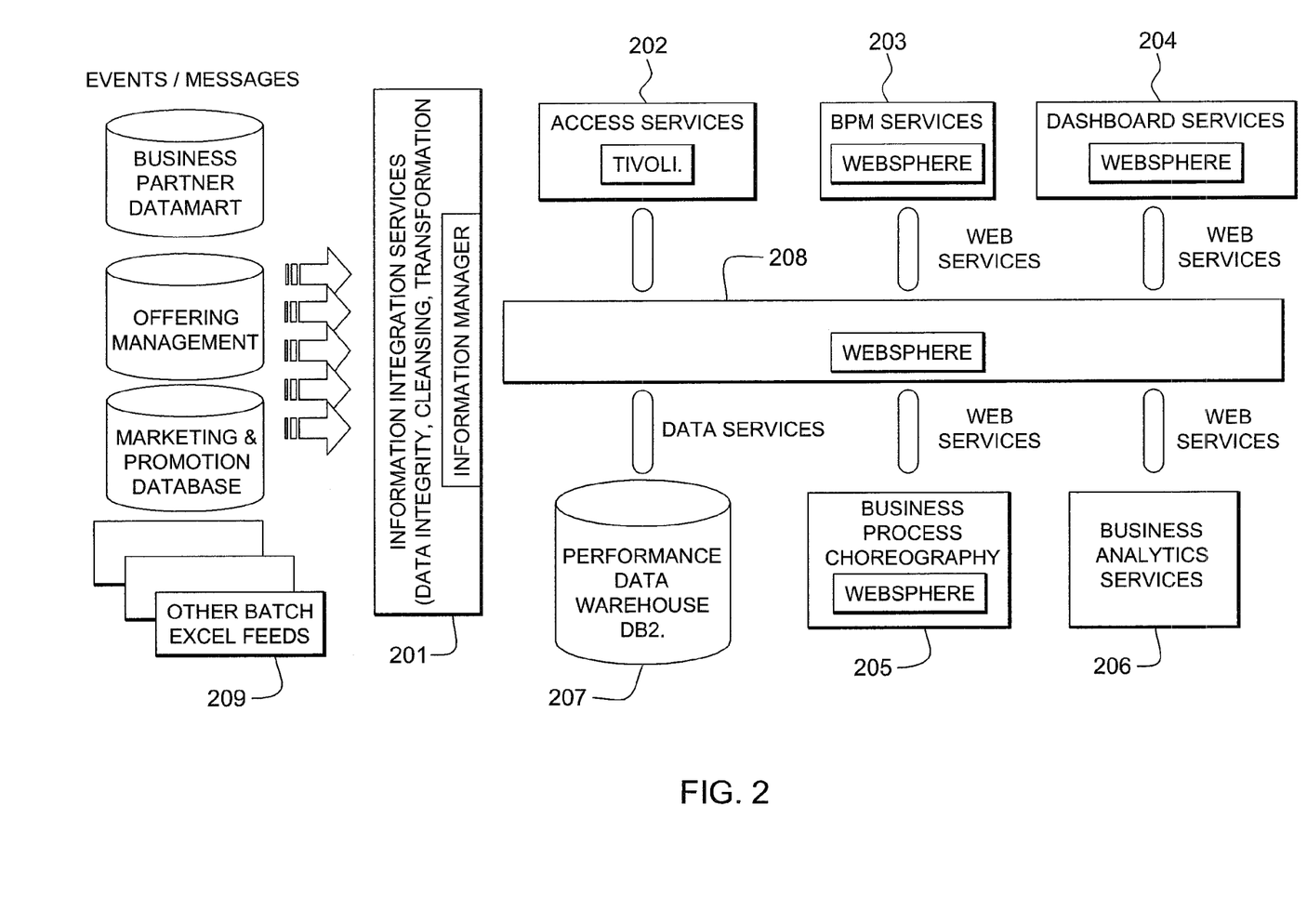
FIG. 2 shows a solution architecture and data flow in accordance with a preferred embodiment of the invention.

In another embodiment of the invention, a system is provided comprising a module that provides real-time visibility of business partner sales and inventory, a module that provides proactive automated alerts based on up-to-date inventory and sales information, and a module that provides optimized buy and sell recommendations based on forecasting and inventory analytics to improve inventory utilization, price protection cost, and customer serviceability FIG. 2 illustrates a preferred solution architecture and data flow 200. This architecture comprises Information Integration Services 201, Access Services 202, Business Performance Management (BPM) Services 203, Business Dashboard Services 204, Business Process Choreography Services 205, Business Analytics Services 206, a Performance Warehouse 207, and a Service Information Bus 208. The Performance Warehouse may be, for instance, a DB2 database.

The Service Information Bus 208 is a middleware layer that provides a set of infrastructure services to form the intersection between service requestors and the various service implementations. It embeds the Information Integration Services that comprise data bridges for extracting all relevant transactional data elements from the source systems 209 and store them in the Performance Warehouse.

The Business Dashboard Services 204 provide business visualization and collaboration services for human users to participate in all Business Performance Management related activities to achieve continuous improvement. These services may comprise customized portals to display metrics, alerts, and analytics results on the dashboard. They may also comprise portlets for drill-down views of metrics by sales region, product family, brand, and business partner account.

The BPM Services 203 provides capabilities to define and monitor performance metrics and generate alerts if performance metrics falls short of established goals. Alert conditions are identified during the analysis and design phase. The threshold values for situation detection are gathered periodically, either via formatted flat files or for direct user inputs via the dashboard.

The Business Process Choreography Services 205 provide decision analysis and tracking of actions taken in response to BPM situations.

The transactional data elements 209 may include inventory, sales out, available-to-sell, open orders, and in transit information. Additional information may be provided about product transitions, sales prices, promotions, product constraints, and open-to-sell inventory. The Performance Warehouse may consume information feeds in formats like EDI, spreadsheets, and batch or real-time XML files.

Analytics and Optimization

Sales out forecasting may be done by predicting "run-rate" demand at the business partner from a statistical forecasting model, and analyzing the entire sales out history of a product to construct a sales out profile. Abnormal events are detected that deviate significantly from the historical profile and the effects of outliers are reduced or removed. Order skew is preferably captured by placing large weights on historical sales in the same week within a quarter.

The optimized "Recommended-Buy" is based on a number of factors. These include optimization, including price protection expenses, inventory carrying costs and customer service. Also, preferably inventory is minimized while achieving a target service level (98% product availability).

Figure 3:
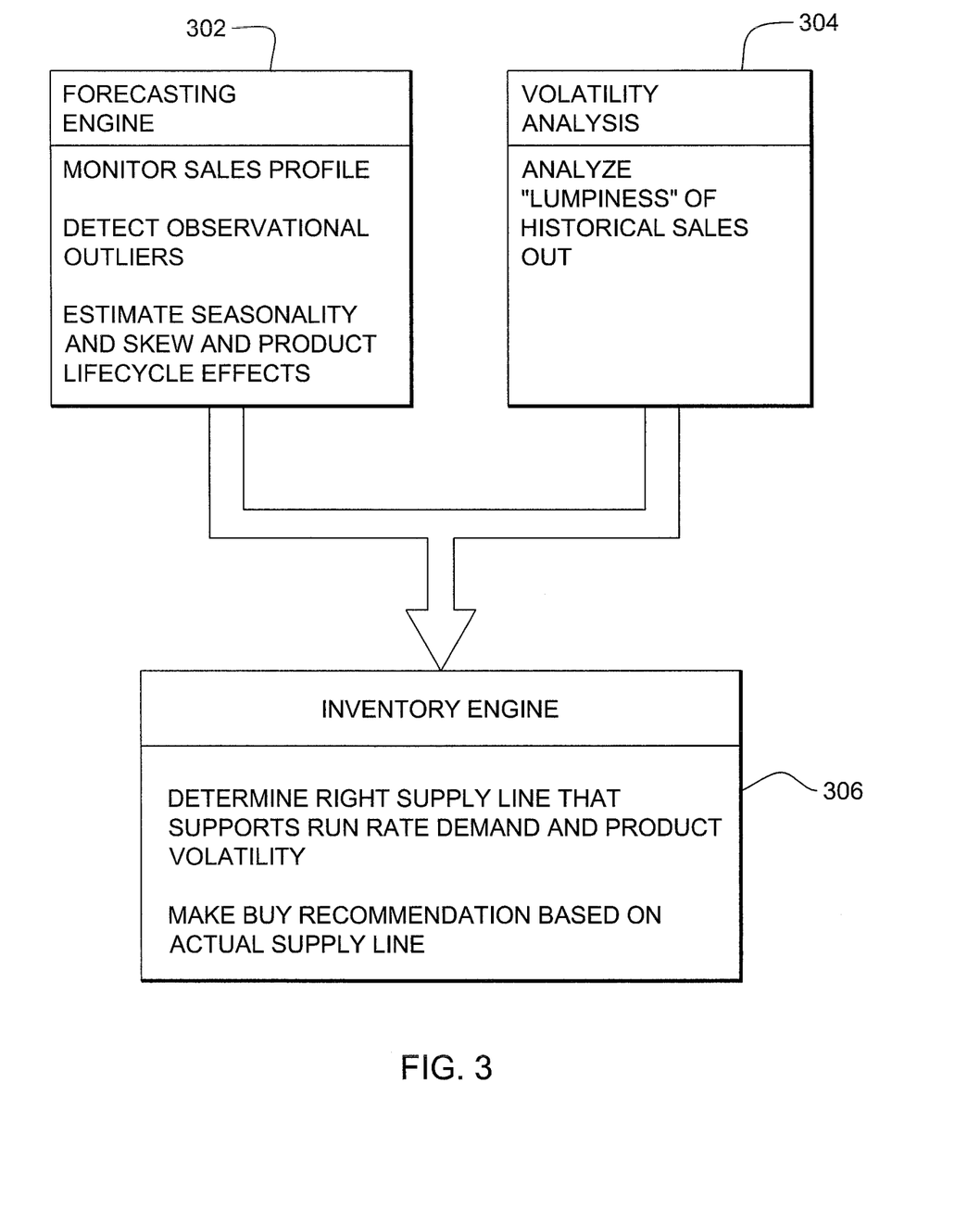
FIG. 3 illustrates functional aspects of components of the present invention.

FIG. 3 illustrates functional aspects of a Forecasting Engine 302 and a Volatility Analysis 304. The Forecasting Engine monitors sales profile, detects observational outliers, and estimates seasonality and skew and product lifecycle effects. The Volatility Analysis analyzes the "lumpiness" of historical sales out. The results of the Forecasting Engine and the Volatility Analysis are sent to an Inventory Engine 306. This Inventory Engine determines the right supply line that supports the run rate demand and product volatility, and makes a buy recommendation based on the actual supply line.

An embodiment of the invention provides a web-based visibility dashboard that provides real-time visibility to business partner sales out and inventories, dynamic forecasting analytics, and innovative inventory analytics for optimized replenishment decisions. This embodiment also provides proactive buy and sell headlights for business partners based on up-to-date inventory and sales information, and proactive automated alerts on stock-outs, aging inventory and price protection risk. In addition, this embodiment of the invention provides dynamic demand shaping to mitigate demand and supply imbalances, and robust product transition planning based on information about predecessor, successor and similar pattern.

Figure 4:
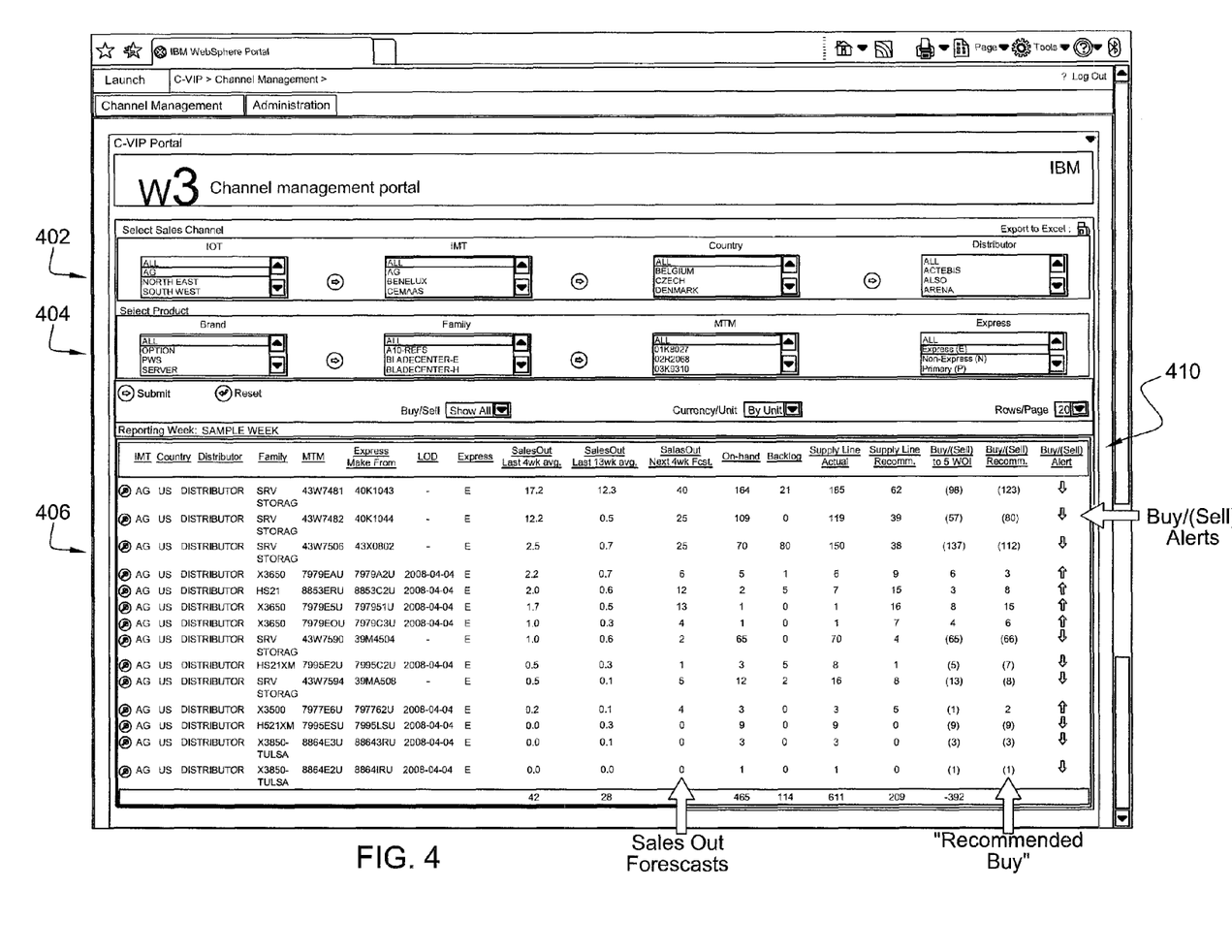
FIG. 4 shows a computer display screen that may be used in the present invention.

FIG. 4 depicts a computer display screen that may be shown in the implementation of this invention. This screen, referred to as a channel view, includes an area 402 used to select a sales channel, and an area 404 used to select a product. This screen display also includes a table 406 that lists a variety of inventory items. For each of these items, the table provides related data, including a sales out forecast, and a recommended buy or sell quantity. The table also includes a column 410 for displaying buy and sell alerts.

Figure 5:
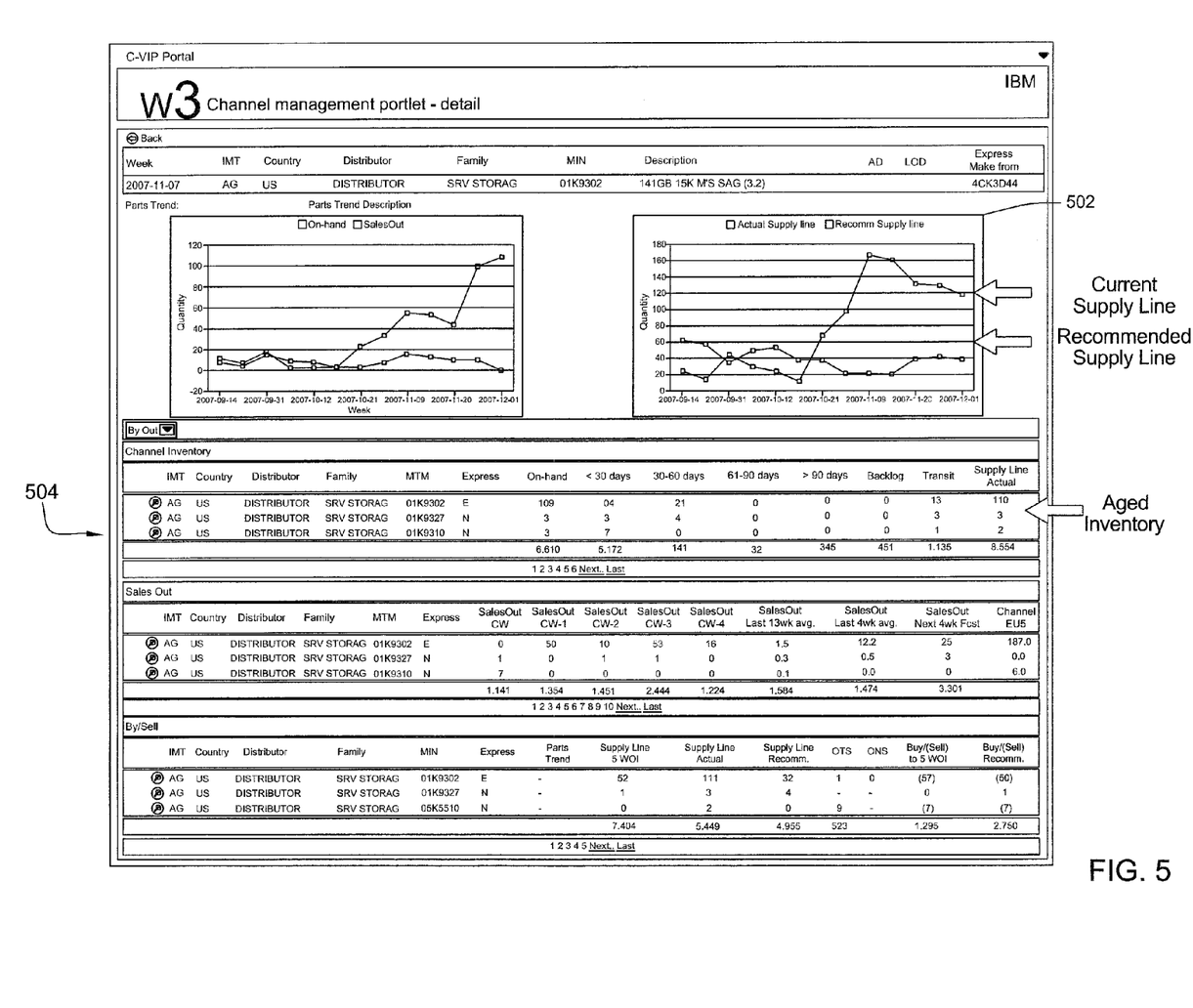
FIG. 5 illustrates another computer display screen that may be used in the present invention.

FIG. 5 illustrates a second computer display screen, referred to as a Product Detail View that may be shown in the practice of the present invention. This screen display includes a graph 502 showing a current supply line and a recommended supply line also over a given number of weeks. Also shown at 504 is a table that identifies a number of inventory items. The table, for example, may show the number of an item that have been in inventory for various lengths of time.

Sales Forecasting

Figure 6:
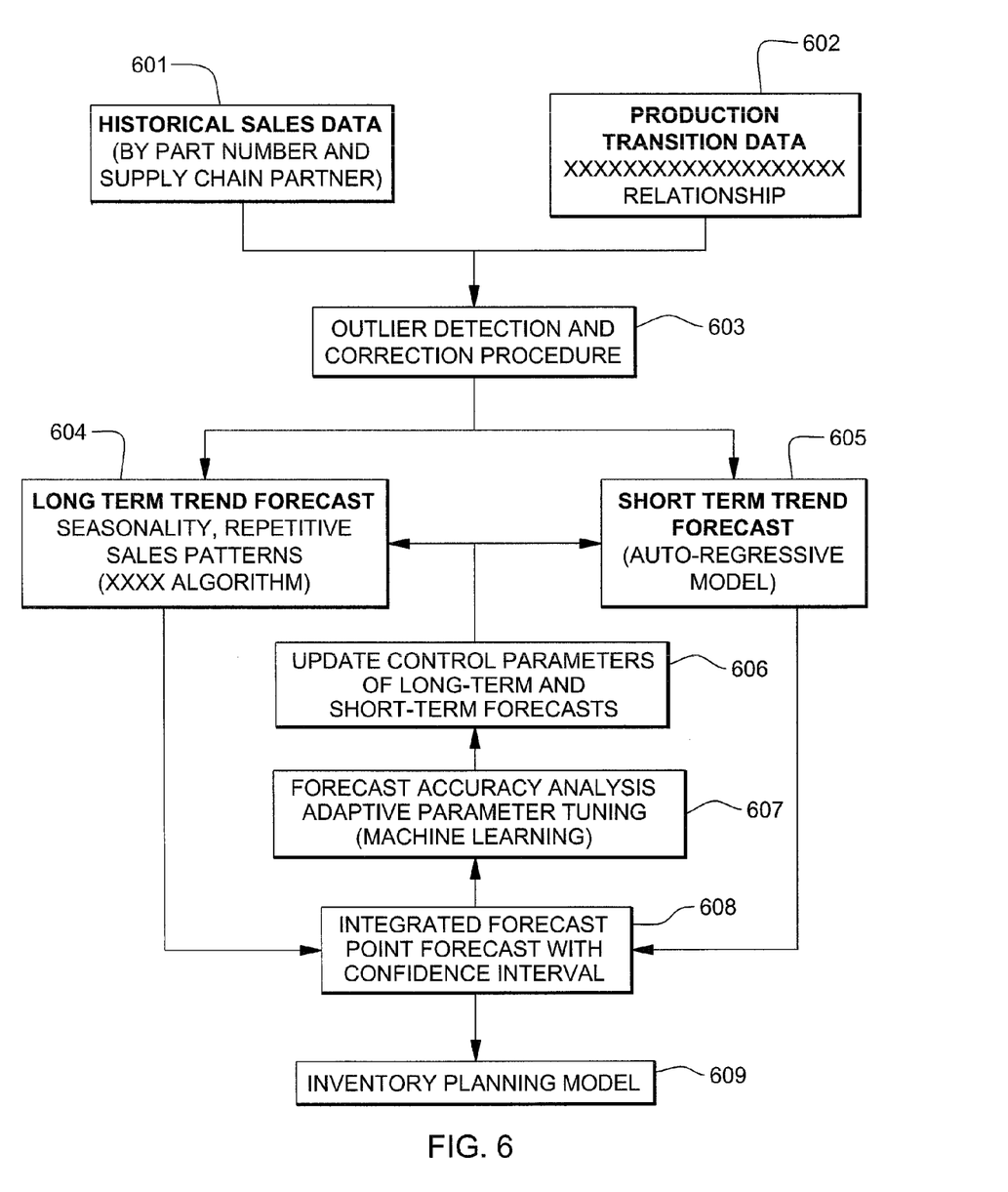
FIGS. 6 and 7 illustrate an inventory policy of an embodiment of the invention.

FIG. 6 shows information flow of the sales forecasting procedure. Historical sales data 601 are inputted to the forecasting engine for each part number and each supply chain partner. In order to deal with the lack of historical data for parts that were recently launched, product transition data 602 is are inputted into the forecast engine. The product transition data comprises predecessor-successor relationships among parts. The sales history of a predecessor product, together with withdrawal date information of the predecessor and product announcement date information of the successor product allows predicting future sales of the successor product.

An outlier detection and correction procedure 603 is applied to eliminate one-time sales events such as corporate roll-outs or promotional sales from the historical sales data. In a preferred embodiment, robust regression can be used to process historical sales data to detect and correct for such outliers.

Next, the processed historical sales data is fed into two forecasting subprocedures. First, a long-term trending procedure 604 detects repetitive sales patterns where, for example, sales in a given period of a quarter follow a similar qualitative pattern in previous quarters. In order to improve the long-term forecast, data points with large deviations from the moving average or median can be discounted. Also, historical data can be discounted based on recency and seasonality. Discounting can be adjusted through control parameters such as discounting factors that are bootstrapped at the beginning of the forecasting process, and subsequently updated based on historical forecast accuracy. This can be implemented through a feedback loop connecting process steps 608, 607, 606 and 604.

Second, a short-term trending procedure 605 detects recent sales trends based on a selected sales horizon, such as 4-6 weeks. For this purpose, an auto-regressive forecasting model can be applied that extrapolates future sales from the evolution of the most recent sales data. Control parameters, such as time to perceive trends, can be bootstrapped at beginning and continually adjusted during the forecasting process as additional data becomes available.

The integrated forecast 608 combines the long-term trend 604 and short-term trend 605 and produces a point sales forecast for a future time period. At the same time, it produces a confidence interval utilizing results for the robust regression model 603. Historical forecast accuracies 607 can be calculated and used to adjust the control parameters 606 that feed into the forecasting procedures 604 and 605.

The inventory planning model in 609 accepts the output of the integrated forecasting procedure 608 and combines information about the current supply line, cost data and supply partner contract specifications to produce a procurement recommendation.

Inventory Modeling

Figure 7:
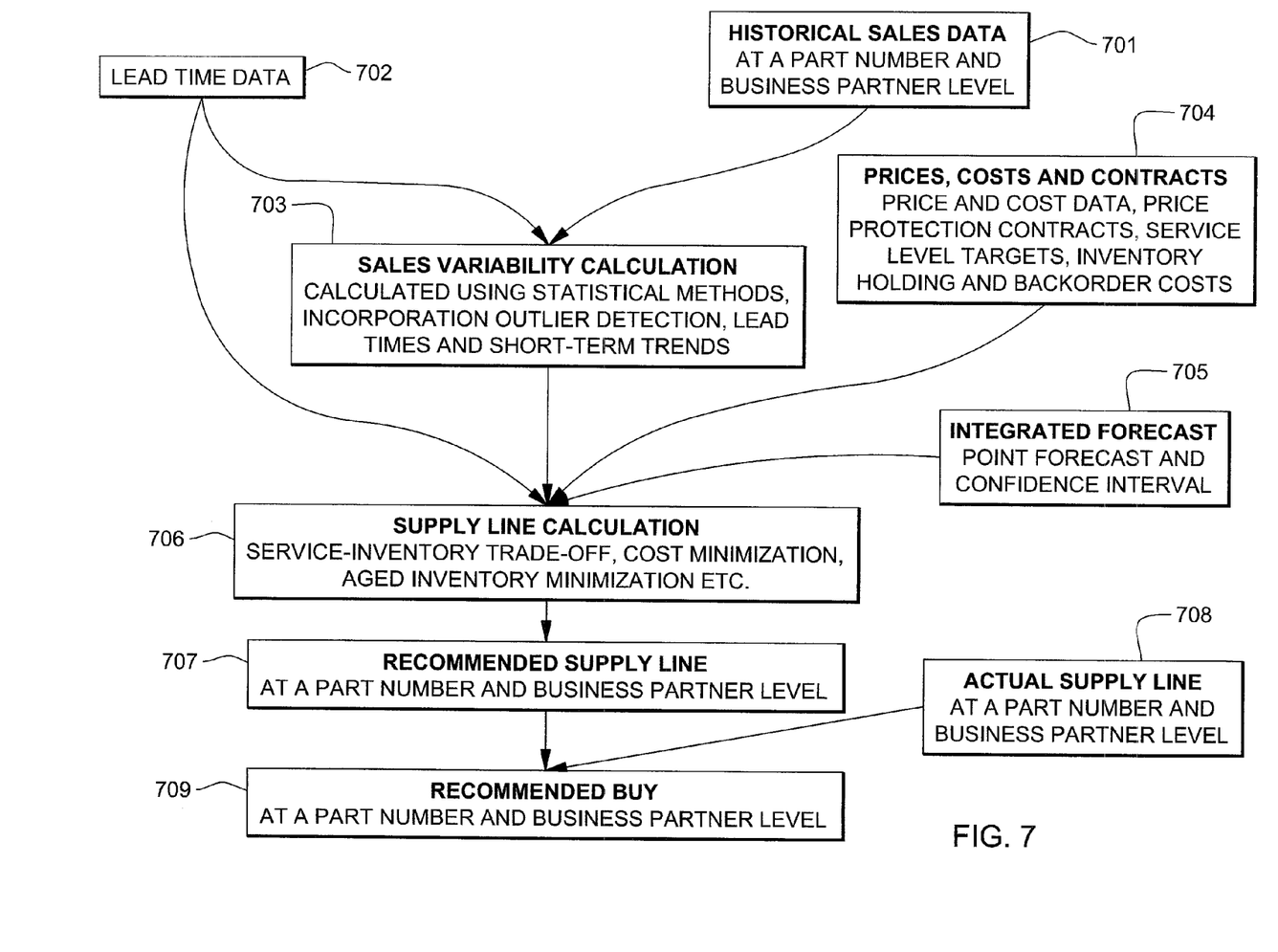

FIG. 7 illustrates the process flow used by the inventory engine to recommend buy quantities. The historical sales data 701 and replenishment lead time data 702 at a part number and supply chain partner level are used to calculate sales variability 703 over the lead time. This is accomplished using statistical methods that first remove outliers in the historical data that would artificially inflate the variability and then calculate the variability after accounting for short-term trends.

The lead time data 702, sales variability over the lead time 703, price, cost and contracts information 704 (such as historical, current and future prices and costs, price protection contract data, service level targets, inventory holding and back order costs), and an integrated forecast 705 (including a point forecast and a confidence interval) are then fed into the supply line calculation 706. The supply line calculation 706 can be performed, for example, using a serviceability-inventory trade-off model (see for example Zipkin 2000), a cost minimization model that includes price protection cost (see for example U.S. patent application Ser. No. 12/127,412, for "Method for Managing Inventory Under Price Protection", filed May 27, 2008, the disclosure of which is herein incorporated by reference in its entirety), or an aged inventory minimization model based on the user selection to generate the recommended supply line 707.

The difference between the recommended supply line 707 and the actual supply line 708 is then used to calculate the recommended buy quantity 709 at a part number and business partner level.

Embodiments of the invention have a number of important capabilities and benefits. Strategic capabilities include a single point of standardized reporting for an OEM and its business partners, customized inventory decisions for each part based on statistical forecasting and risk-optimized recommended buy, proactive buy/sell headlights to business partners for each part, and proactive automated alerts on stock-outs, aging inventory and price protection risk for demand shaping or demand conditioning. Additional strategic capabilities are robust product transition planning based on information about predecessor, successor and similar pattern, efficient channel collaboration processes with reduced manual efforts, and optimized manufacturing & channel inventory, and end-to-end supply chain synchronization.

Significant business benefits of the preferred embodiment of the invention include fewer inventories in the channel while maintaining high product availability, reduced strain on manufacturing by smoothing the flow of orders results in better supplier collaboration, and lower inventory carrying costs for business partners. Additional important business benefits are fewer inventory write-offs for business partners, improved cash flow and budgeting for the OEM due to reduced price protection expenses, and more efficient management of collaboration process using analytical inventory decision-making and reduced manual efforts.

The invention will be generally implemented by a computer executing a sequence of program instructions for carrying out the invention. The sequence of program instructions may be embodied in a computer program product comprising media storing the program instructions.

As will be readily apparent to those skilled in the art, the present invention, or aspects of the invention, can be realized in hardware, software, or a combination of hardware and software. Any kind of computer/server system(s)—or other apparatus adapted for carrying out the functions described herein—is suited. A typical combination of hardware and software could be a general-purpose computer system with a computer program that, when loaded and executed, carries out the functions, and variations on the functions as described herein. Alternatively, a specific use computer, containing specialized hardware for carrying out one or more of the functional tasks of the invention, could be utilized.

Figure 8:
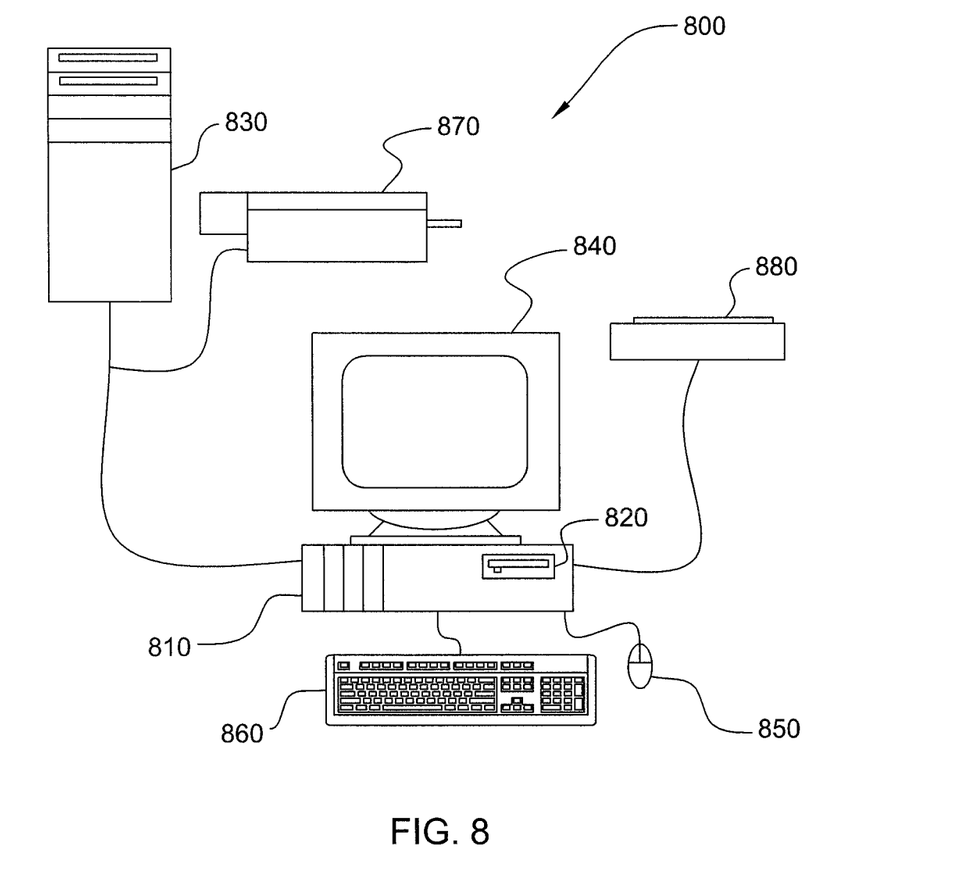
FIG. 8 shows a computer system that may be used to carry out this invention.

A computer-based system 800 in which a method embodiment of the invention may be carried out is depicted in FIG. 8. The computer-based system 800 includes a processing unit 810, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 810 through a disc drive 820, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 810, as mentioned, or may be located on a remote system such as a server 830, coupled to processing unit 810, via a network interface such as an Ethernet interface. Monitor 840, mouse 850 and keyboard 860 are coupled to the processing unit 810, to provide user interaction. Scanner 880 and printer 870 are provided for document input and output. Printer 870 is shown coupled to the processing unit 810 via a network connection, but may be coupled directly to the processing unit. Scanner 880 is shown coupled to the processing unit 810 directly, but it should be understood that peripherals might be network coupled, or direct coupled without affecting the ability of the processing unit 810 to perform the method of the invention.

Although examples of the present invention have been shown and described, it will be appreciated by those skilled in the art that changes might be made in these embodiments without departing from the principles and spirit of the invention, the scope of which is defined in the claims.

What is claimed is:

1. A method of implementing an automated inventory replenishment process between a manufacturer and a business partner, the method comprising:

purchasing and maintaining, by the business partner, an inventory of goods from the manufacturer;

providing, by the manufacturer, price protection to the business partner for the purchasing of the goods from the manufacturer; and managing said inventory by using an automated process that takes into account said price protection for the purchasing of the goods, including using said price protection to determine a recommended buy to replenish the inventory of goods, and including displaying a graph showing a current supply line and a recommended supply line over a given time period, the current supply line showing a quantity of the goods actually supplied to the business partner from the manufacturer over said time period, the recommended supply line showing a quantity of the goods recommended to be supplied to the business partners from the manufacturer over said time period, and using a difference between the current supply line and the recommended supply line to calculate a recommended buy quantity to replenish the inventory of goods; and performing, using a computer system implementing an inventory replenishment program, the steps of using said price protection to determine a recommended buy, and using a difference between the current supply line and the recommended supply line to calculate a recommended buy quantity.

2. The method according to claim 1, wherein the managing said inventory includes:
   providing real-time visibility of sales and inventory of the business partner; and
   providing pro-active automated alerts based on up-to-date inventory and sales information.

3. The method according to claim 2, wherein the providing real-time visibility of sales and inventory includes providing a Web-based visibility dashboard that provides real-time visibility to business partner sales out and inventories.

4. The method according to claim 2, wherein the providing real-time visibility of sales and inventory includes:
   predicting run-rate demand at the business partner from statistical forecasting model; and
   analyzing entire sales out history of a product to construct sales out profile.

5. The method according to claim 4, wherein the providing real-time visibility of sales and inventory further includes:
   detecting abnormal events that deviate significantly from historical profile, and reducing or removing the effects of said abnormal events; and
   capturing order skew by placing larger weights on historical sales in the same week within a quarter.

6. The method according to claim 2, wherein the providing real-time visibility of sales and inventory includes using a forecasting engine to monitor sales profile, detect observational outliers, and estimate seasonality and skew and product lifecycle effects.

7. The method according to claim 1, wherein the managing said inventory includes:
   providing optimized buy and sell recommendations based on forecasting and inventory analytics; and
   providing demand shaping to mitigate demand and supply imbalances.

8. The method according to claim 7, wherein the providing optimized buy and sell recommendations includes providing said recommendations based on customer serviceability, price protection expenses, or aged inventory costs.

9. The method according to claim 8, wherein the providing optimized buy and sell recommendations further includes a sales forecast calculation, a sales variability calculation, a supply line calculation, and a recommended buy and sell quantity calculation.

10. A system for implementing an automated inventory replenishment process between a manufacturer and a business partner, wherein the business partner purchases and maintains an inventory of goods from the manufacturer, and the manufacturer provides price protection to the business partner for the purchasing of the goods from the manufacture, the system for implementing an automated inventory replenishment process comprising one or more processor units configured for:
   managing said inventory by using an automated process that takes into account said price protection for the purchasing of the goods, including using said price protection to determine a recommended buy to replenish the inventory of goods, and including displaying a graph showing a current supply line and a recommended supply line over a given time period, the current supply line showing a quantity of the goods actually supplied to the business partner from the manufacturer over said time period, the recommended supply line showing a quantity of the goods recommended to be supplied to the business partners from the manufacturer over said time period, and using a difference between the current supply line and the recommended supply line to calculate a recommended buy quantity to replenish the inventory of goods.

11. The system according to claim 10, wherein the managing said inventory includes:
   providing real-time visibility of sales and inventory of the business partner;
   providing pro-active automated alerts based on up-to-date inventory and sales information;
   providing optimized buy and sell recommendations based on forecasting and inventory analytics; and
   providing demand shaping to mitigate demand and supply imbalances.

12. The system according to claim 11, wherein the providing real-time visibility of sales and inventory includes:
   predicting run-rate demand at the business partner from statistical forecasting model; and
   analyzing entire sales out history of a product to construct sales out profile.

13. The system according to claim 12, wherein the providing real-time visibility of sales and inventory further includes:
   detecting abnormal events that deviate significantly from historical profile, and reducing or removing the effects of said abnormal events; and
   capturing order skew by placing larger weights on historical sales in the same week within a quarter.

14. An article of manufacture comprising:
   at least one computer usable device having computer readable program code logic tangibly embodied therein to execute a machine instruction in one or more processing units for implementing an automated inventory replenishment process between a manufacturer and a business partner, wherein the business partner purchases and maintains an inventory of goods from the manufacturer, and the manufacturer provides price protection to the business partner for the purchasing of the goods from the manufacturer, and said computer readable program code logic, when executing, performing the following:
   managing said inventory by using an automated process that takes into account said price protection for the purchasing of the goods, including using said price protection to determine a recommended buy to replenish the inventory of goods, and including displaying a graph showing a current supply line and a recommended supply line over a given time period, the current supply line showing a quantity of the goods actually supplied to the business partner from the manufacturer over said time period, the recommended supply line showing a quantity of the goods recommended to be supplied to the business partners from the manufacturer over said time period, and using a difference between the current supply line and the recommended supply line to calculate a recommended buy quantity to replenish the inventory of goods.

15. The article of manufacture according to claim 14, wherein the managing said inventory includes:
   providing real-time visibility of sales and inventory of the business partner;
   providing pro-active automated alerts based on up-to-date inventory and sales information;
   providing optimized buy and sell recommendations based on forecasting and inventory analytics; and
   providing demand shaping to mitigate demand and supply imbalances.

16. The article of manufacture according to claim 15, wherein the providing real-time visibility of sales and inventory includes:
   predicting run-rate demand at the business partner from statistical forecasting model;
   analyzing entire sales out history of a product to construct sales out profile;
   detecting abnormal events that deviate significantly from historical profile, and reducing or removing the effects of said abnormal events; and
   capturing order skew by placing larger weights on historical sales in the same week within a quarter.

17. The article of manufacture according to claim 16, wherein the providing optimized buy and sell recommendations includes:
   providing said recommendations based on price protection expenses, inventory carrying costs and customer service; and
   minimizing inventory while achieving a given target service level.

18. The method according to claim 1, wherein the recommended supply line and the current supply line are shown over each other on said graph.

19. The method according to claim 1, wherein the managing said inventory includes:
   providing a web-based visibility dashboard that provides real-time visibility to business partner sales out and inventories, dynamic forecasting analytics, and innovative inventory analytics for optimized replenishment decisions;
   providing proactive buy and sell headlights for business partners based on up-to-date inventory and sales information, and proactive automated alerts on stock-outs, aging inventory and price protection risk; and
   providing dynamic demand shaping to mitigate demand and supply imbalances, and robust product transition planning based on information about predecessor, successor and similar patterns.

* * * * *